(12) United States Patent
Rosenkrantz et al.

(10) Patent No.: US 10,587,054 B2
(45) Date of Patent: Mar. 10, 2020

(54) SYSTEM AND METHOD FOR OPERATING CONFORMAL ANTENNA

(71) Applicant: ELTA SYSTEMS LTD., Ashdod (IL)

(72) Inventors: Mark Rosenkrantz, Ashdod (IL); Harel Badichi, Modi'in (IL); Gregory Lukovsky, Givat-Shmuel (IL); Haim Reichman, Mazkeret Batia (IL)

(73) Assignee: ELTA SYSTEMS LTD., Ashdod (IL)

( * ) Notice: Subject to any disclaimer, the term of this patent is extended or adjusted under 35 U.S.C. 154(b) by 324 days.

(21) Appl. No.: 15/628,494

(22) Filed: Jun. 20, 2017

(65) Prior Publication Data
US 2018/0013210 A1    Jan. 11, 2018

(30) Foreign Application Priority Data

Jul. 7, 2016 (IL) .......................... 246651

(51) Int. Cl.
| | | |
|---|---|---|
| H01Q 21/26 | (2006.01) | |
| H01Q 3/26 | (2006.01) | |
| H01Q 21/24 | (2006.01) | |
| H01Q 1/28 | (2006.01) | |
| H01Q 3/22 | (2006.01) | |
| H01Q 13/18 | (2006.01) | |
| H01Q 21/06 | (2006.01) | |
| G01S 7/40 | (2006.01) | |

(52) U.S. Cl.
CPC ............ *H01Q 21/26* (2013.01); *H01Q 1/286* (2013.01); *H01Q 3/22* (2013.01); *H01Q 3/26* (2013.01); *H01Q 3/267* (2013.01); *H01Q 13/18* (2013.01); *H01Q 21/061* (2013.01); *H01Q 21/245* (2013.01); *G01S 7/4026* (2013.01)

(58) Field of Classification Search
CPC .......... H01Q 21/26; H01Q 1/286; H01Q 3/22; H01Q 3/267; H01Q 13/18; H01Q 21/061; H01Q 21/245
USPC ...................................................... 342/375
See application file for complete search history.

(56) References Cited

U.S. PATENT DOCUMENTS

| | | | | |
|---|---|---|---|---|
| 5,463,656 A | * | 10/1995 | Polivka .................. | H01Q 1/286 348/E7.093 |
| 5,623,270 A | | 4/1997 | Kempkes et al. | |
| 5,663,720 A | * | 9/1997 | Weissman ............... | G01S 13/91 340/905 |
| 6,057,802 A | * | 5/2000 | Nealy .................. | H01Q 9/0407 343/700 MS |
| 6,333,712 B1 | | 12/2001 | Haugse et al. | |

(Continued)

*Primary Examiner* — Harry K Liu
(74) *Attorney, Agent, or Firm* — Dorsey & Whitney LLP

(57) ABSTRACT

A method and system are presented for managing operation of a conformal phased-array antenna. The method comprises: providing structural data about the antenna to be operated, said structural data comprising data indicative of a geometry of a curved radiating surface defined by an arrangement of N antenna elements of the phased array and data indicative of said arrangement of N antenna elements; utilizing input data indicative of a selected direction of antenna operation and processing said structural data about the antenna, said processing comprising determining operational data for each of the antenna elements defining a desired radiation pattern of the antenna for said selected direction, said operational data comprising amplitude, phase and polarization of radiation for each antenna element.

24 Claims, 8 Drawing Sheets

(56) References Cited

U.S. PATENT DOCUMENTS

| | | | |
|---|---|---|---|
| 6,421,528 B1* | 7/2002 | Rosen | H04B 7/18513 |
| | | | 455/67.16 |
| 10,170,833 B1* | 1/2019 | Hollenbeck | H01Q 3/26 |
| 10,243,276 B2* | 3/2019 | Ford | H01Q 21/0025 |
| 2003/0095066 A1* | 5/2003 | Brogden | H01Q 3/26 |
| | | | 342/372 |
| 2011/0006948 A1 | 1/2011 | Larregle et al. | |
| 2013/0234890 A1 | 9/2013 | Chethik et al. | |

* cited by examiner

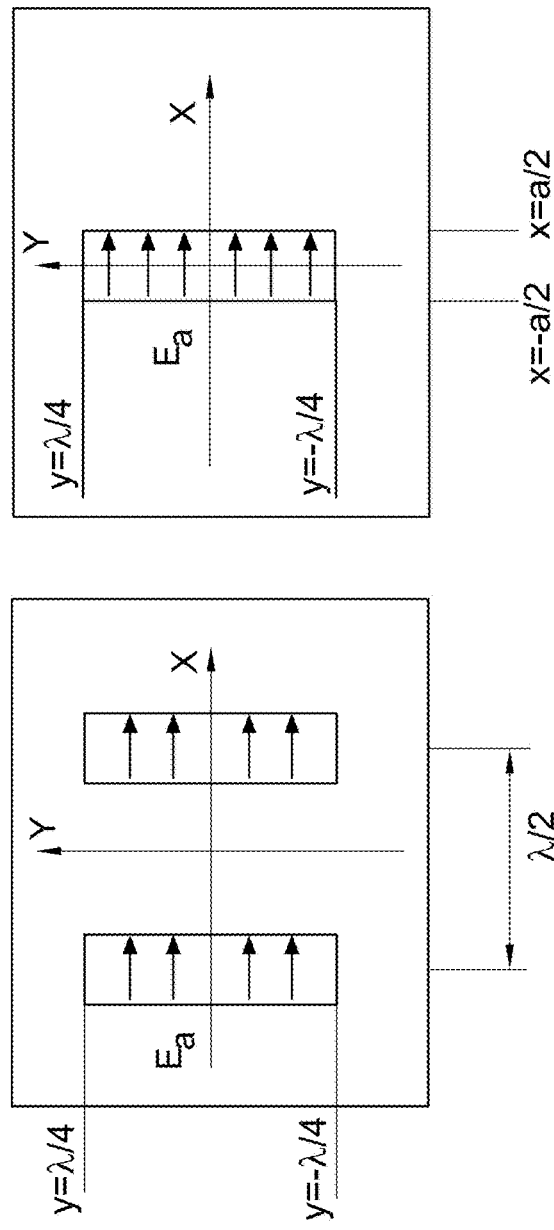

SYSTEM AND METHOD FOR OPERATING CONFORMAL ANTENNA

TECHNOLOGICAL FIELD AND BACKGROUND

The present invention is in the field of conformal antennas, and relates to a system and method for operating a conformal antenna.

Conformal antennas are designed to conform or follow a certain specific shape of a surface on which the antenna is to be mounted, typically a curved surface. Conformal antennas are used in aircrafts (civilian or military), ships, land vehicles, including also train antennas, car radio antennas, and cellular base station antennas. The use of conformal antennas in such devices provides to save space and also to make the antenna less visually intrusive by integrating it into existing objects.

Conformal antennas typically utilize a phased array of antenna elements, where each antenna element is driven by a controlled phase shifter, to provide directionality of radiation pattern of the antenna. Hence, the antenna can transmit radiation mainly in a prescribed direction (particular target zone), and be sensitive to the signal from the particular target while rejecting interfering signals from other directions.

In a conformal antenna, the antenna elements are mounted on a curved surface, and therefore the phase shifters operate to compensate for the different phase shifts caused by the varying path lengths of the radiation waves due to the location of the individual antenna elements on the curved surface.

GENERAL DESCRIPTION

There is a need in the art for a novel approach for controlling operation of a conformal phased array antenna to provide desired antenna radiation pattern in a particular spatial direction.

The present invention provides a method and system for antenna operation, taking into account structural data about the antenna in order to improve the antenna performance. The structural data of the conformal antenna is defined by geometry (shape) of a surface which this antenna is to conform, and the arrangement of radiating elements (antenna elements) in the phased array. The shape of such surface is typically determined by considerations other than electromagnetic, for example aerodynamic or hydrodynamic.

According to the invention, the structural data about the antenna and the selected radiation direction are analyzed to determine the operational data for each antenna element in the conformal antenna, namely amplitude, phase and polarization of radiation for each antenna element. The structural data about the antenna comprises data indicative of the geometry of a curved radiating surface defined by an arrangement of N antenna elements of the phased array and data indicative of this arrangement of N antenna elements.

The analyzing/processing of the structural data comprises determining, for each selected direction of antenna operation, a set of M out of N elements (M≤N) to be operated (by the operational data) to provide the desired radiation pattern of the antenna. These are elements which provide sufficient gain in the selected direction (e.g. in accordance with the boresights relative to the selected direction).

Then, for the selected direction, certain beam forming data is determined. The beam forming data comprises at least a phase pattern and a polarization pattern corresponding to the desired radiation pattern, and is defined by respectively, operative phases and polarizations for the selected M antenna elements. Preferably, the beam forming data further comprise an intensity pattern data, comprising intensity values for the M elements, respectively.

The operative polarization of the antenna element is indicative of a polarization state of radiation of the respective antenna element. The operative polarization may be defined by a ratio between two orthogonal polarizations in the antenna element radiation, such that variation of this ratio provides for variation of the polarization state of the antenna element. The ratio between two orthogonal polarizations in the antenna element is determined based on a relative orientation of the selected antenna radiation direction with respect to a boresight direction of the antenna element.

The operative phase of the antenna element is defined by a distance between the respective antenna element on the curved radiating surface and a virtual plane, being a plane perpendicular to the selected antenna radiation direction for the radiation of a predetermined wavelength. The operative amplitude of the antenna element may also be determined in accordance with a distance between the respective element on the curved surface and said virtual plane perpendicular to the selected antenna radiation direction. Indeed, the conformal antenna is a 3D structure, and accordingly the phase and magnitude, which is distanced from such virtual plane, are to be corrected in order to form the desired antenna beam (directed radiation pattern) in a particular spatial direction.

According to the method of the invention, the operational data for each antenna element may be controllably modified in accordance with variation of the input direction data (i.e. steering the radiation direction).

Thus, according to one broad aspect of the invention, there is provided a method for managing operation of a conformal phased-array antenna, the method comprising:

providing structural data about the antenna to be operated, said structural data comprising data indicative of a geometry of a curved radiating surface defined by an arrangement of N antenna elements of the phased array and data indicative of said arrangement of N antenna elements;

utilizing input data indicative of a selected direction of antenna operation and processing said structural data about the antenna, said processing comprising determining operational data for each of the antenna elements defining a desired radiation pattern of the antenna for said selected direction, said operational data comprising amplitude, phase and polarization of radiation for each antenna element.

The structural data may for example include the location of each antenna element on the curved surface and the boresight of each antenna element (e.g. being perpendicular to the curved surface at said location).

According to another broad aspect of the invention, it provides a computerized system for managing operation of a conformal phased-array antenna, the system comprising:

a memory utility for storing structural data about a given antenna to be operated, said structural data comprising data indicative of geometry of a curved radiating surface of said antenna and data indicative of an arrangement of N antenna elements in the phased-array;

data input utility for receiving input data indicative of a selected direction of antenna operation; and data processor and analyzer utility configured to process said structural data about the antenna, and generate operational data for each of the antenna elements to obtain a desired radiation pattern of the antenna for said selected direction (antenna beaming pattern), said operational data comprising amplitude, phase and polarization of radiation for each antenna element.

The data processor and analyzer utility may comprise a direction controller module, and a beam forming module. The direction controller module is configured and operable to utilize the input data about the selected direction of antenna operation, and determine, for each selected direction, a set of M out of N antenna elements to be operated by the operational data for the desired radiation pattern of the antenna. The beam forming module is configured and operable to determine, for each selected direction, beam forming data comprising at least a phase pattern and a polarization pattern corresponding to the desired radiation pattern, said phase and polarization patterns comprising, respectively, operative phase and polarization for each of said M elements.

The beam forming module may be configured and operable as described above to determine the at least phase and polarization patterns of the respective antenna element based on a distance between the respective antenna element on said curved surface and a virtual plane being a plane perpendicular to the selected direction. Preferably, the beam forming module is further configured and operable to determine the amplitude pattern data comprising amplitude values for the M elements, respectively, the amplitude value of the respective antenna element being determined based on a distance between the respective antenna element on said curved surface and said virtual plane.

The system may further include a control utility connectable to the beam forming module and operating to utilize the operational data for adjusting at least the phase and polarization of the antenna elements, and possibly also modifying the operational data for each of the antenna elements in accordance with variation of the input direction data.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which:

FIG. 9 schematically exemplifies an array/matrix of ten antenna elements of the selected active sector considered for polarization correction by providing, for each element a predetermined ratio between two orthogonal polarization components; and FIGS. 10A and 10B show two examples of antenna element considered in the calculation of the polarization correction.

DETAILED DESCRIPTION OF EMBODIMENTS

Figure 1A:
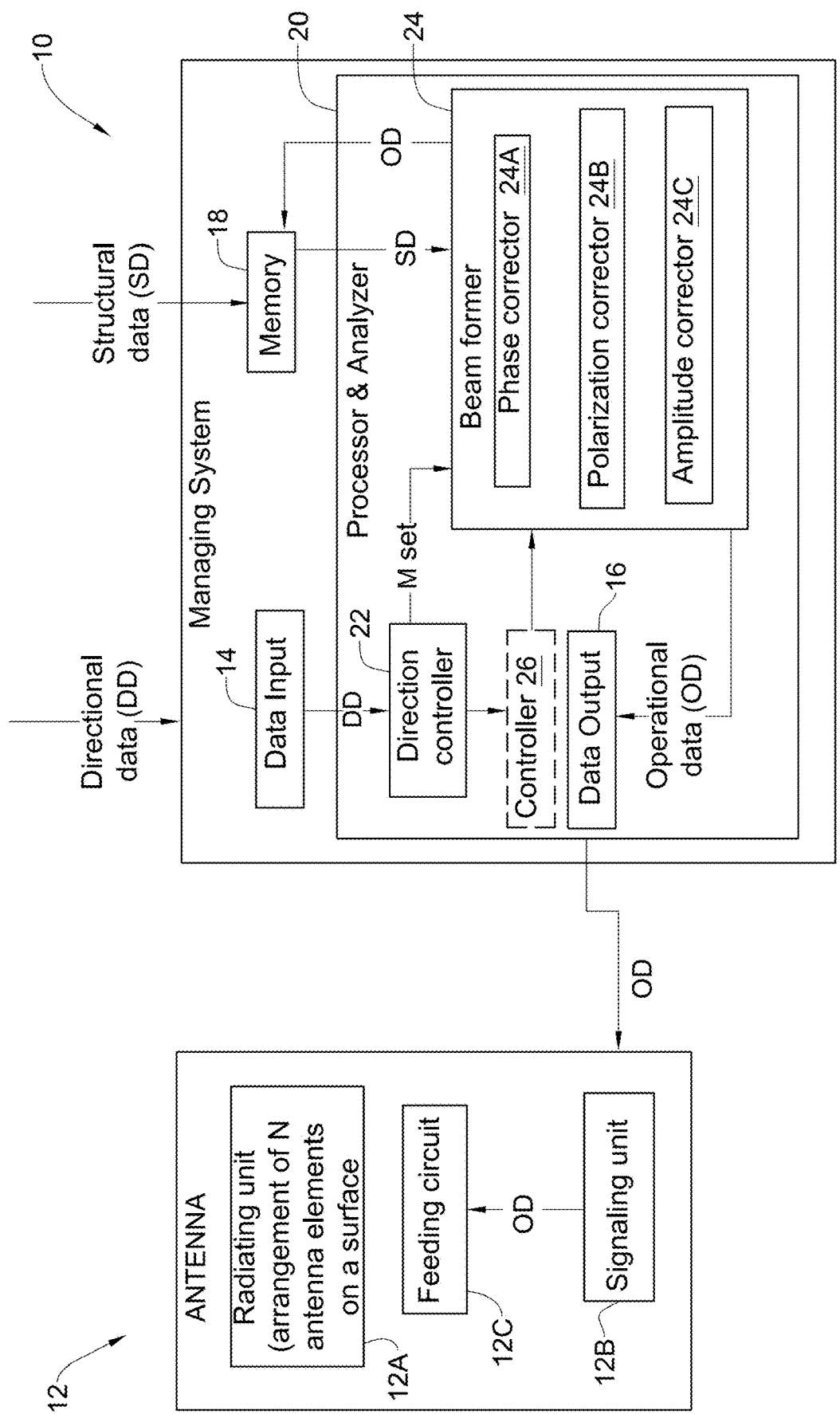
FIG. 1A is a block diagram exemplifying configuration and operation of a computerized system of the invention for managing/controlling operation of a conformal phased-array antenna.

Reference is made to FIG. 1A, which illustrates, by way of a block diagram a system 10 of the invention configured and operable for managing operation of a conformal phased-array antenna 12. The construction of a conformal phased-array antenna are known per se and do not form part of the invention, and therefore need not be specifically described, except to note that conformal antenna is designed to conform to a given surface, which is typically non-planar (curved) surface.

Generally, antenna structure has such main functional parts as a radiating unit 12A, a signaling unit 12B, and a feeding circuit 12C. The radiating unit 12A includes an arrangement of a phased array of N antenna elements (radiating elements); and the signaling unit 12B has a corresponding array of electronic circuits (receivers/transmitters) that operate the array of antenna elements, respectively, to provide a desired radiation pattern of the antenna (in receiving and transmitting modes).

The management system 10 of the invention is a computerized system associated with the signaling unit 12B of the antenna. The system 10 may be incorporated in or be connectable to the signaling unit 12B (via wires or wireless signal transmission). The system 10 is configured and operable to provide operational data OD for each of the antenna elements (via the respective electronic circuits) to obtain a desired radiation pattern of the antenna for a given (selected) direction of antenna radiation.

The system 10 includes inter alia such main structural and functional parts (software/hardware utilities) as data input and output utilities 14 and 16; memory 18; and data processor and analyzer 20. Structural data SD about the given radiating unit 12A of the antenna 12, which is to be operated, is provided (e.g. entered by user) and stored in the memory 18. Such structural data SD includes geometrical data GD which is indicative of a geometry of a curved radiating surface of the radiating unit 12A and data indicative of a given arrangement of N radiating elements in the phased-array as distributed on the radiating surface.

As indicated above, the geometrical data GD is determined by the geometry (shape and size) of the surface which the radiating unit should conform to. As for the number of radiating elements and their arrangement in the phased array, these are typically selected to meet the requirements of the frequency and gain requirements of the radiation pattern. The factors that are typically considered for configuring a phased array antenna are known per se and do not form part of the invention, and therefore need not be described in details, except to note the following. For an antenna array in general (e.g. planar antenna array), the larger the length of a segment on which the antenna elements of the array are arranged, the narrower the beam (smaller beam width) and higher the gain that can be obtained, i.e. the better the directivity of the radiation pattern. On the other hand, a distance between the adjacent antenna elements in the phased array is dictated by the operating frequency of the antenna array and desired reduction/suppression of side-lobes. The practical upper limit for such distance is $\lambda/2$.

Thus, the structural data about the given radiating unit is predetermined configuration data (e.g. user input into the system). This data may be prestored in the memory (being internal memory of the system or an external storage device that can be accessed, e.g. via a communication network).

Also input into the system is a directional data DD, i.e. data indicative of a selected radiation direction of antenna operation. It should be understood that this data may be dynamic data, as the radiation direction may vary for example for steering purposes. Accordingly, the operation data for the elements of the given antenna array varies with the change of the radiation direction.

The data processor and analyzer utility 20 is preprogrammed (configured) to utilize the input direction data DD and process the structural data SD about the radiating unit 12A, and generate operational data for at least some of the antenna elements (as will be described further below) to obtain the desired radiation pattern of the antenna for the selected direction. Thus, the output data generated by the data processor and analyzer utility 20 includes, for each antenna element, such parameters as amplitude, phase and polarization of radiation.

As further exemplified in FIG. 1A, the data processor and analyzer utility 20 includes a direction controller module 22, and a beam forming module 24. The direction controller module 22 is adapted to utilize the input directional data DD and determine a set (e.g. sub-arrangement) of M out of N elements (M≤N) to be operated by the operational data to provide the desired radiation pattern. Such sub-arrangement of M elements actually presents an active sector of the array. This will be described more specifically further below.

The beam forming module 24 is adapted to determine beam forming data BFD for each selected antenna radiation direction, i.e. for the selected M antenna elements defining the selected active sector of the array. The beam forming data BFD includes a phase pattern $P_{ph}$ and a polarization pattern $P_{pol}$ (and possibly also intensity/amplitude pattern $P_{ampl}$) corresponding to the desired radiation pattern of the antenna. The phase pattern $P_{ph}$ is defined by (is a function of) operative phases of the M antenna elements, $P_{ph}(P^{(l)}_{ph}; \ldots P^{(m)}_{ph})$; and the polarization pattern $P_{pol}$ is defined by (is a function of) operative polarizations of the M antenna elements, $P_{pol}(P^{(l)}_{pol}; \ldots P^{(m)}_{pol})$. As also will be described more specifically further below, the operative polarization of the respective antenna element is determined by a ratio between two orthogonal polarizations in the antenna element radiation.

The beam forming module 24 thus includes a phase analyzer 24A and a polarization analyzer 24B, and possibly also the amplitude analyzer 24C. As will be described more specifically further below, the operative phase and amplitude of the antenna element are determined based on a distance between said antenna element on the physical radiating surface (non-planar) of the radiating unit 12A and a virtual plane being a plane perpendicular to the selected antenna radiation direction. The operative phase is also determined for a certain wavelength being used.

Figure 1B:
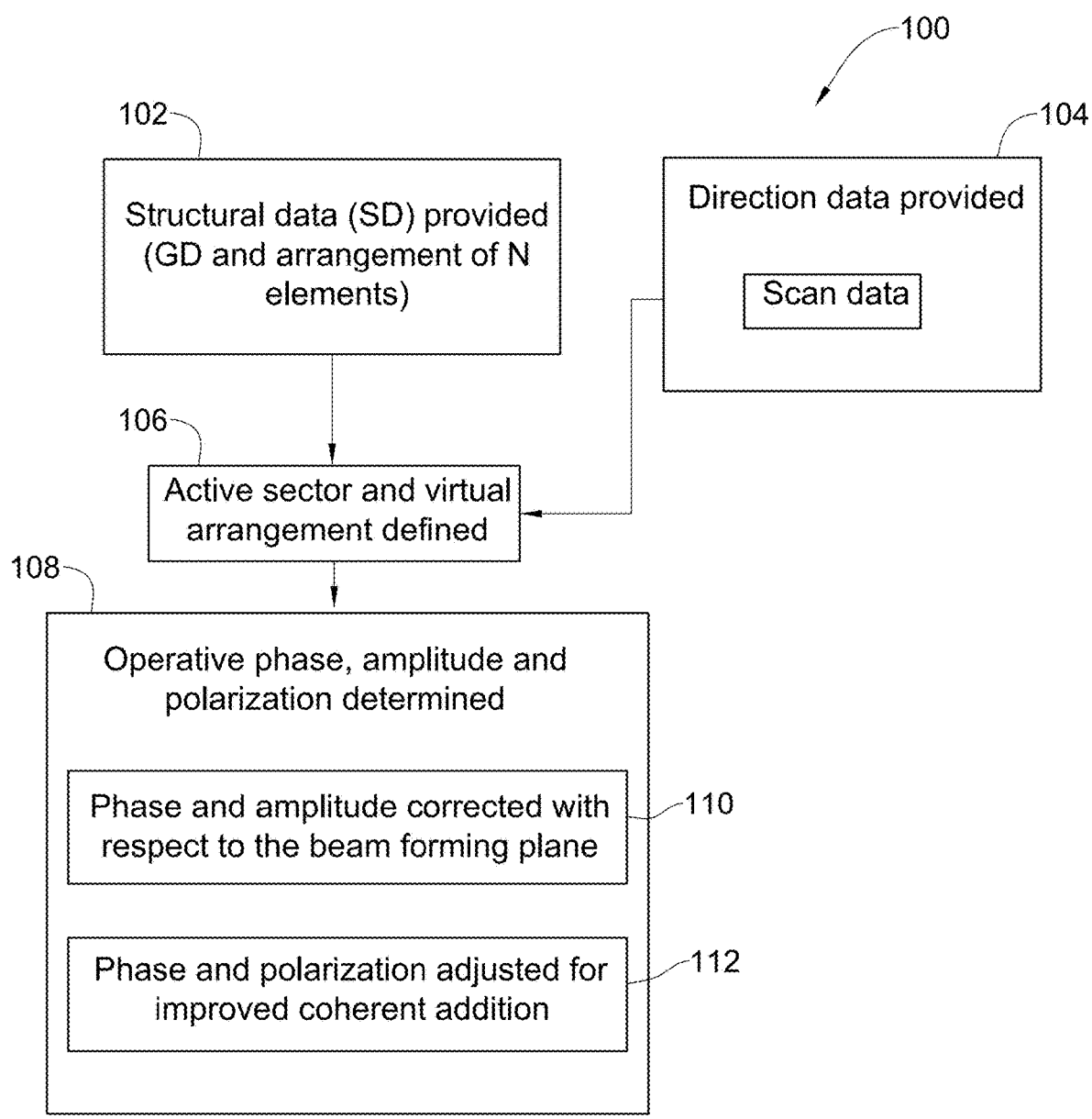
FIG. 1B is a flow diagram exemplifying a method of the invention for controlling operation of a conformal phased array antenna.

As further exemplified in FIG. 1A, the system 10 may also include a controller utility 26, which is responsive to a change in the input directional data and is adapted to modify the operational data for each of the antenna elements in accordance with variation of the input direction data. Such controller 26 may be part of the controller module 22. For example, the system may operate to create operational data for the specific antenna structural data and specific active sector (angular range), and store such operational data in the memory, and then, e.g. during the scanning of these angular segment), the operational data is modified in accordance with the direction change data provided by controller 26. The system operational scheme is described more specifically further below with reference to FIG. 1B.

As described above, the operational data of the antenna elements is to provide antenna beaming in the desired direction. This is achieved by beam forming causing coherent addition of the radiation components (being transmitted or received) of the multiple antenna elements. In order to obtain such coherent addition between multiple radiation components in the desired direction, the radiation components of the selected different antenna elements (having interfering radiation components) which propagate in the desired direction, should match one another in frequency, phase and polarization.

Conventional beam forming typically deals with phase adjustment in order to obtain the beam in the desired direction (constructive interference in the desired direction). Indeed, in a planar phased array, all the antenna elements "face" the same direction (i.e. all the antenna elements have the same boresight direction), and the polarization of radiation components of the different elements is similar. Therefore, these radiation components coherently add up to form the radiation beam in said radiation direction, with substantially no losses associated with polarization and phase mismatches. Thus, in this planar case, proper adjustment of the phase only enables to obtain desired directionality of the antenna operation.

However, in conformal antennas, the elements generally do not face the same direction, and therefore the polarizations and phases, as well as amplitudes, of their radiation components for the selected radiation direction are somewhat different (even for the case the antenna elements are similar to one another). This is a source of energy losses in the radiation pattern of the desired direction.

Thus, the inventors have shown that a conformal phased array antenna can be properly operated to improve the directionality of the conformal antenna radiation. As described above, and also schematically illustrated by a flow diagram 100 of FIG. 1B, this is implemented as follows:

The structural data about the radiating unit is provided (step 102) and stored (in the memory), either in the system memory 18 or an external storage device which can be accessed by the system via a communication network. The structural data SD includes geometrical data about the radiating surface (shape and dimension) and data about the arrangement of the antenna elements on the radiating surface. More specifically, the structural data is indicative of the locations of the elements and their boresights. In this connection, it should be understood that the present invention can be used with any configuration of the radiating surface, having more complicated shapes, namely including surface portions of different shapes (e.g. different curvatures being parts/segments of different cylinders, thus being characterized by different depths or "heights", as will be described below).

The direction data DD is then provided (step 104). The direction data may include data (e.g. vector) indicative of the direction to which beam forming is to be provided. In cases scanning is sought, it may also include scanning/steering data, namely a time pattern of change in the antenna radiation direction. The direction data defines the location and size of the active sector to be selected within the radiating surface of the antenna (within the curved surface), i.e. group/set/sub-array of the M radiating elements. As will be described further below, the selected direction defines a virtual plane (perpendicular to the selected direction) serving as an effective surface (being a so-called zero phase and polarization surface)—step 106. This effective surface is actually the beam forming surface/plane per selected direction, and the operative phase and polarization, as well as amplitude, are determined with reference to this effective surface.

The active sector data and the beam forming plane may vary during the scanning/steering. For each radiation direction, a virtual element in the effective surface is determined for each of the selected antenna element, thus determining a virtual arrangement of the radiating elements per scan direction. The virtual element is the projection location for the physical element onto the virtual plane, whereby the boresight of the virtual element is perpendicular to the virtual plane.

It should thus be understood that the term "virtual element" is used herein only to facilitate understanding and assist in the computation task of the beam forming from the physical conformal antenna. Actually, the goal is to operate physical elements in a way that the respective virtual elements (virtual planar phase array) provide the phase, polarization and amplitude for coherent addition in the desired direction with minimal losses.

Thus, the beam former module operates to determine operative phase, amplitude, and polarization for each antenna element, as described above (step 108). These are actually phase, amplitude and polarization corrections for the beam forming purposes. The phase and amplitude of the selected elements are first corrected to "project" the phase and amplitude values from the curved surface onto the virtual planar surface, such that the virtual elements have no phase and amplitude difference (resulting from the distance between the element on the physical curved surface and the virtual planar one)—step 110. Then, the phase and polarization are further adjusted to maximize the beaming in the desired direction, i.e. maximize/improve the coherent addition between radiation components of the elements—step 112. More specifically, in order to form a beam in the desired direction it is understood that the virtual elements should have the same phases (zero phase difference plane) and should have the same polarization (zero polarization difference). Then according to the present invention, the distance between each virtual element and its respective physical one is used to determine a phase difference (correction data) between the physical and virtual elements (as well as amplitude decay between them) which is to be used for operating the physical element. The angular orientation difference between the boresight of the virtual and physical elements is used to determine the polarization correction.

The so-determined operational data can be transmitted to the signaling unit 12B of the antenna for proper operation of each respective antenna element to create the desired antenna pattern. The operational data is modified with the change in the radiation direction. In this connection, it should be understood that the same active sector can be used for a certain steering/scanning angle. Therefore, as long as the active sector and accordingly the beam forming plane are maintained, the only step to be performed is step 112 for adjustment/modification of the phase and polarization.

Figure 2A:
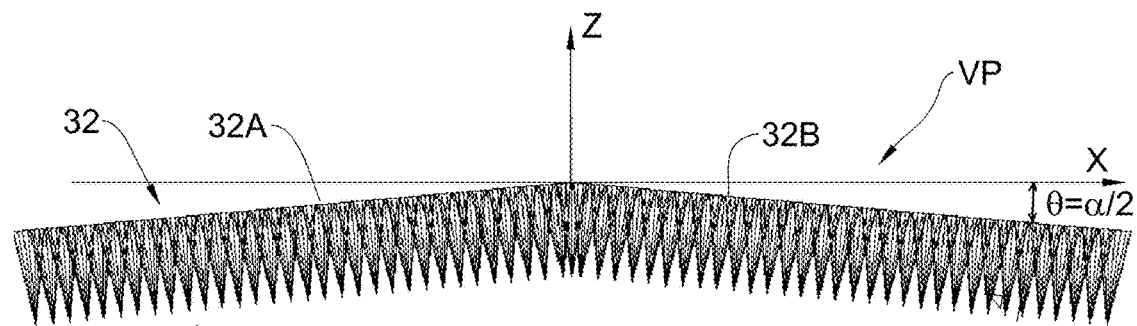
FIGS. 2A to 2C schematically illustrate examples of radiating units in a confocal phased-array antenna.
Figure 2B:
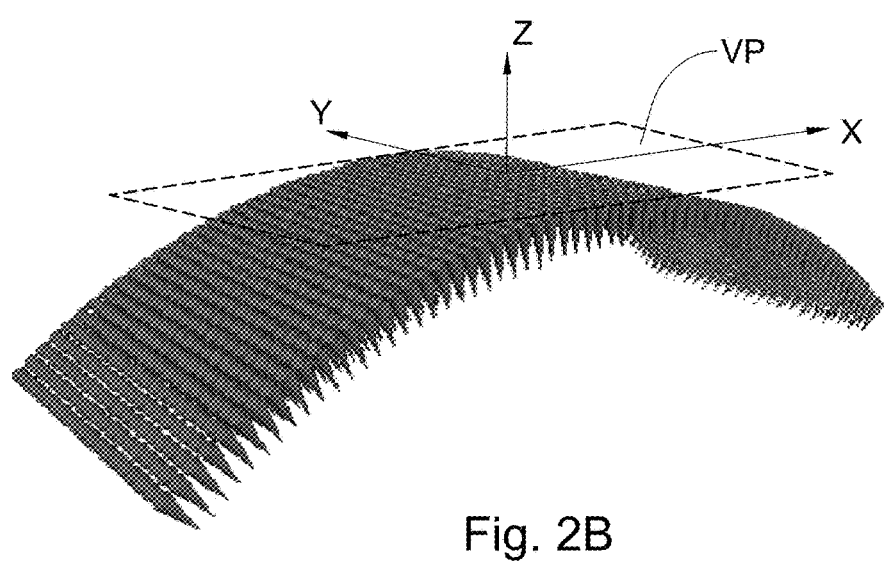
Figure 2C:
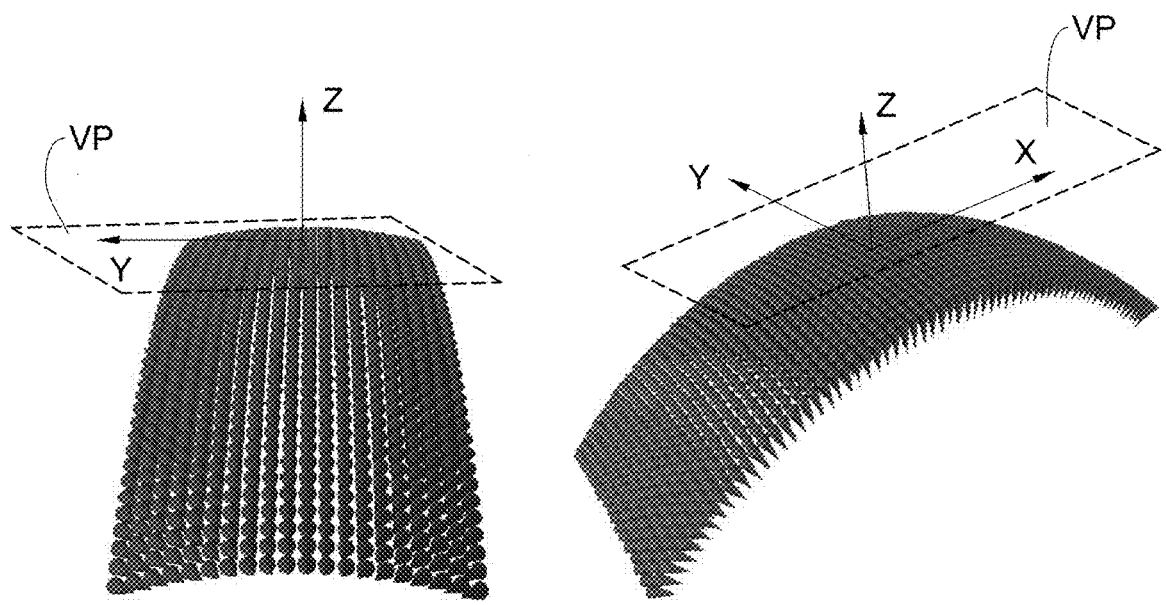

Reference is made to FIGS. 2A, 2B and 2C showing some specific but not limiting examples of the radiating unit 12A of the antenna. The diagrams shown in the figures were generated with the aid of General Reflector Antenna Software Package (GRASP), developed by TICRA, Copenhagen, Denmark, for calculating electromagnetic radiation from systems consisting of multiple reflectors, multiple feeds, and/or multiple feed arrays.

As shown, the radiating unit 12A is a 3D structure formed by multiple antenna elements 30 arranged in a spaced-apart relationship on a curved radiating surface 32. It should be noted, although not specifically shown, that in a more complicated case, the conformal antenna may be formed of portions of different geometries (curvatures), and therefore the operation of each such portion is processed and analyzed separately.

To facilitate understanding, the functionally similar elements/features are indicated by the same reference numbers in all the examples. In the example of FIG. 2A, the radiating unit 12A is configured as a bent antenna, i.e. the radiating surface 32 is in the form of two planar surfaces 32A and 32B joined together at a certain angle, a. In the example of FIG. 2B, the radiating unit 12A is configured as a cylindrical antenna, and in the example of FIG. 2C the radiating unit 12A is configured as a spherical antenna.

As shown in the FIGS. 2A-2C, in a non-planar antenna configuration (which is typically the case with conformal antenna), the radiating elements are arranged on a non-planar radiating surface. As a result, an effective radiating surface (a so-called "zero phase" surface) defining a beam forming plane for a selected radiation direction, is located in a virtual plane VP, being a plane perpendicular to the selected radiation direction. In such configuration, operative data for each radiating element, i.e. phase, polarization and amplitude, is to be considered with respect to the effective radiating surface (virtual beam forming plane).

For the optimal operation of such a conformal antenna, the phase and polarization, as well as the magnitude (amplitude), of radiation of a 3D structure of the antenna element should be corrected in the weighting (taper) of the antenna elements in order to form an antenna beam (directed radiation) in a particular spatial direction. To this end, antenna elements coordinates are to be defined.

Figure 3A:
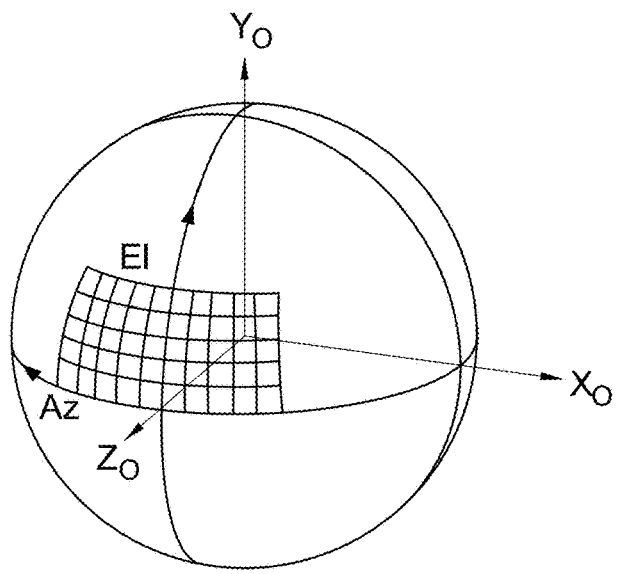
FIGS. 3A to 3C schematically illustrate determination of the coordinates of antenna elements in a conformal phased array antenna.
Figure 3B:
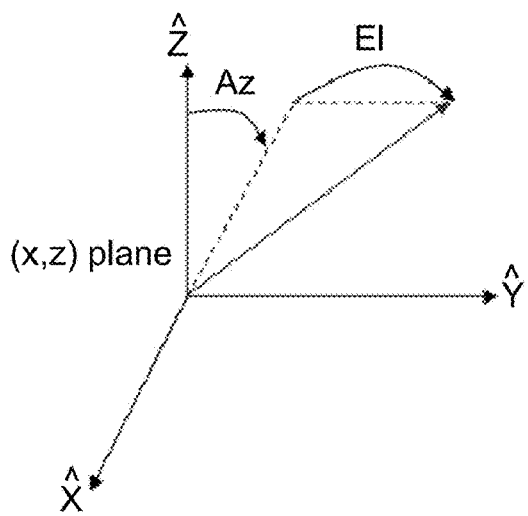
Figure 3C:
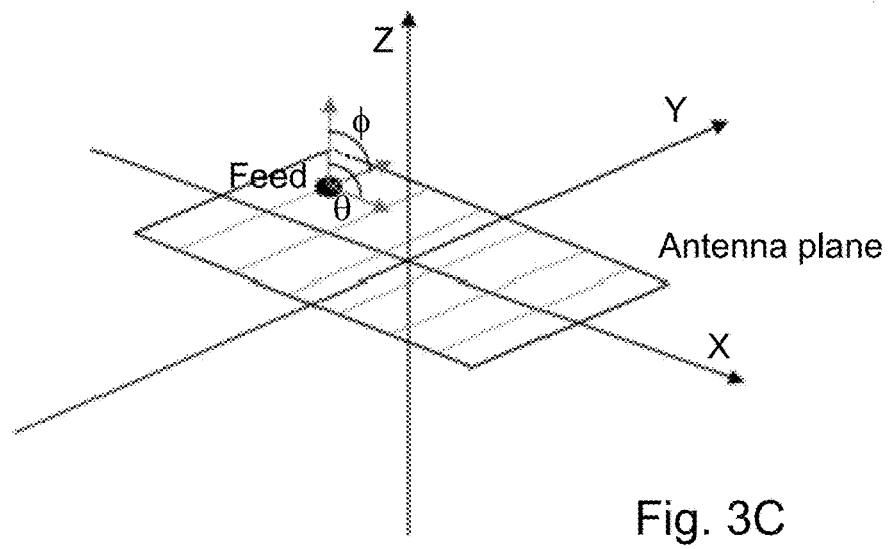

In this connection, reference is made to diagrams of FIGS. 3A to 3C. A 3D coordinate grid (with respect to the antenna) can be defined by applying an azimuth-over-elevation set-up. In this example, the grid is drawn for azimuth Az and elevation El of $-30°\leq Az \leq 30°$ and $0°\leq El \leq 30°$. The radius vector to any point in the 3D space for a spherical sector is given by:

$$\hat{r} = -\hat{x} \sin Az \cos El + \hat{y} \sin El + \hat{z} \cos Az \cos El$$

The individual coordinate axes and the spatial angles Az and El are then described by:

$$\begin{cases} x = -R\sin Az \cos El \\ y = R\sin El \\ z = R\cos Az \cos El \end{cases} ; \begin{cases} \dfrac{-x}{z} = \tan Az \\ \dfrac{y}{R} = \sin El \end{cases} ; \begin{cases} Az = \arctan\left(\dfrac{-x}{z}\right) \\ El = \arcsin\left(\dfrac{y}{R}\right) \end{cases}$$

FIG. 3C exemplifies how the axes directions of the phased array antenna (radiating unit) are defined. Here, the X-Y plane is the virtual antenna plane (planar antenna) and the Z-axis defines the radiation direction of the antenna. Thus, if the antenna radiating unit is a simple planar phased array of the antenna elements, then the principal axis of the radiation transmitted/received by the radiating element (i.e. boresight) is in parallel to the Z-axis or perpendicular to the plane X-Y of the antenna. In this case, angle θ of orientation of the boresight of the antenna element with respect to Y-axis and angle φ of orientation of the boresight of the antenna element with respect to X-axis are all zero degrees. As for an angle (not shown) describing the orientation of radiation polarization components of the antenna element with respect to X- and Y-axes in such planar configuration is also equal to zero (the polarization components are perpendicular to the radiation direction).

If, however, the phased array radiating unit is of the conformal surface type as exemplified in FIG. 3A (in the form of a diagram generated using GRASP), i.e., the radiating surface conforms to some geometrically shaped surface (non-planar) of the platform on which it is mounted, then the boresight of the antenna element may not be parallel to the desired antenna radiation direction Z, and accordingly the above angles θ and φ for the physical radiating surface are different. In such non-planar configuration, the antenna radiation pattern is determined by "virtual" arrangement of the radiating elements in the effective radiating surface located in the virtual plane VP. The virtual arrangement of the radiating elements corresponds to projections of the real antenna elements from the physical curved radiating surface onto the virtual plane forming the effective radiating surface.

Let us consider specifically the radiating unit configurations exemplified for the non-planar configurations of FIGS. 2A-2C.

In the case of bent antenna configuration (FIG. 2A), the radiating elements 30 are arranged in spaced-apart relationship on the radiating surface 32 formed by two planar surfaces 32A and 32B joined together at angle α. In this case, the angle θ is determined as θ=±α/2 (where the sign indicates on which side of the origin in the X-Z plane lies the feed (radiating element); the angle φ is zero, and the polarization describing angle ψ=0. As shown in the figure, the virtual plane VP is the X-Y plane passing through the intersection point between the planar surface 32A and 32B, In the case of the cylindrical antenna (FIG. 2B), these angles are as follows:

$$\theta = \pm \frac{D_x}{L_z} \cdot \frac{\pi}{180}$$

$$\varphi = 0; \phi = 0$$

where the sign indicates on which side of the origin in the X-Z plane lies the feed; $L_z$ is the length (radius) along the Z-axis; and $D_x$ relates to the spacing (equal or approximately equal) between the antenna elements on the physical surface of the cylindrical antenna.

Figure 4:
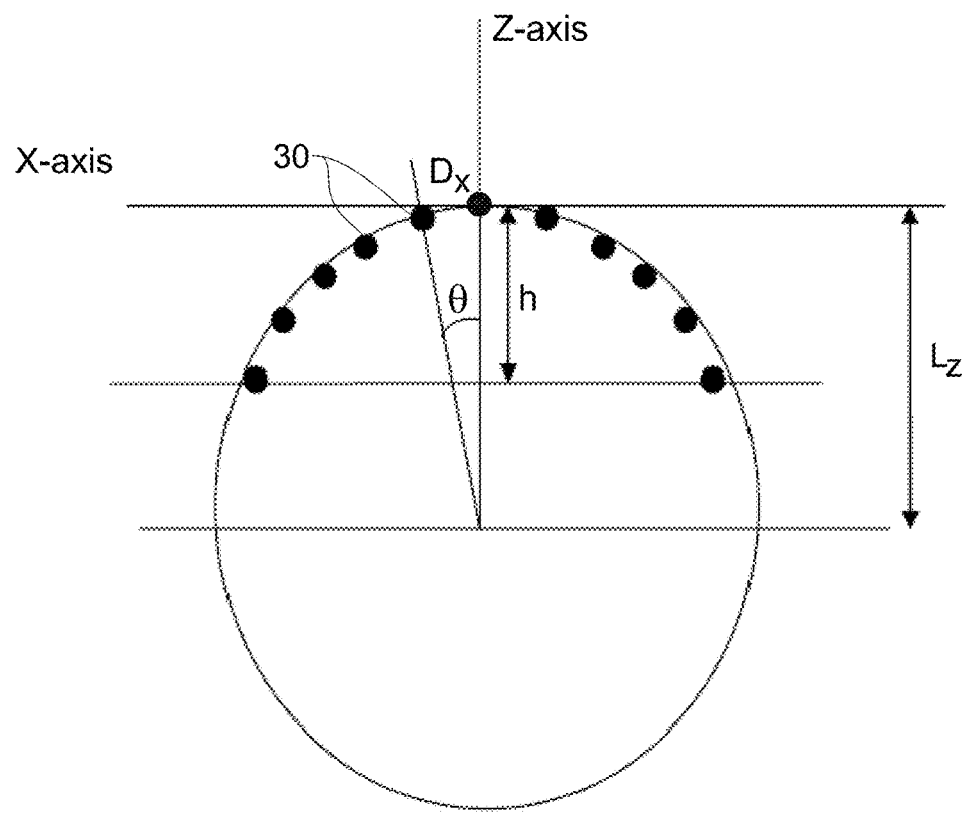
FIG. 4 more specifically illustrates an example of the arrangement of the antenna elements on a cylindrical surface of the radiating unit.

In this connection, reference is made to FIG. 4, more specifically illustrating the arrangement of the antenna elements 30 on the cylindrical surface 32. The elements are arranged on the cylindrical surface 32 being a segment of a circle having radius $L_z$, spaced from the center of the circle a distance ($L_z$–h) defining a depth of curvature (a so-called "height" h) of the cylindrical antenna.

In this configuration, the effective radiating surface is located in the virtual plane VP being the X-Y plane perpendicular to the radiating direction of each element and being a tangential plane to the cylindrical segment 32. In the effective radiating surface, the arrangement of N elements is represented by a corresponding array of $N_x$ elements, each being a projection of the respective radiating element onto the X-Y plane.

The height h of the cylindrical antenna can thus be determined as:

$$h = L_z \cdot \left\{ \cos\left\{ \frac{N_x - 1}{2} \cdot \frac{D_x}{L_z} \right\} - 1 \right\}$$

where $D_x$ is the equal distance between the neighboring radiating elements along the cylindrical antenna surface (physical antenna).

It should be understood that in such most practical cases of equally or almost equally spaced physical antenna elements, the virtual antenna elements (projections) on the virtual planar antenna will be differently spaced from one another, and moreover different virtual arrays will be characterized by different spacing between the virtual elements corresponding to the same physical elements. This spacing between the virtual elements can be easily calculated and taken into account for proper selection of the antenna elements to be used for a desired directional beaming.

Let us consider the case that a physical antenna is built such that the antenna elements are arranged on a physical curved surface with spacing between the antenna elements providing that their projections on a virtual plane (above or below) the surface of the antenna results in equal spacing of the virtual elements on the virtual plane. According to FIG. 4, for given equal spacing, $x_c$, on the virtual plane, and the radius $L_z$ of curvature of the antenna surface, we have:

$$Dx_n = L_z \cdot \sin^{-1}\{((2n-1)/2) \cdot x_c / L_z\}$$

where $Dx_n$ is the spacing of the n-th element on the antenna surface and n is the number of the element from the origin of the coordinate axis. The limit for the number of elements for a particular beam direction will be:

$$((2n-1)/2) \cdot x_c \leq L_z$$

Figure 5:
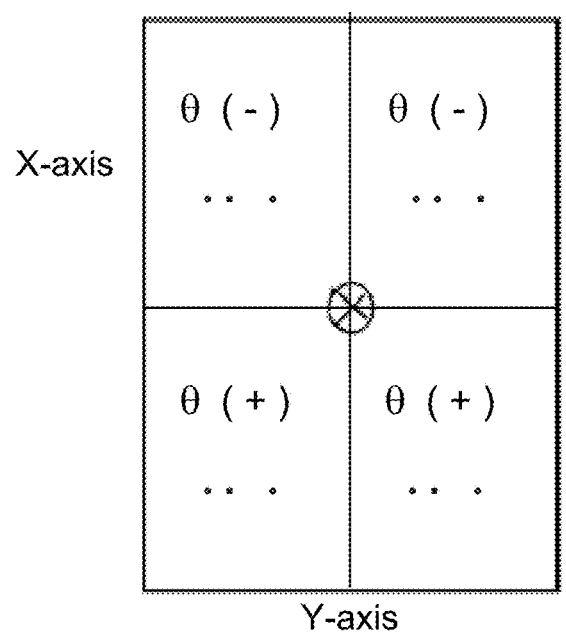
FIG. 5 illustrates a diagram of the spherical antenna used in calculations of the angles between the element radiation direction and the desired antenna radiation.

In the case of spherical antenna (FIG. 2C), the angles are determined as follows:

$$\theta = \pm \frac{D_x}{L_z} \cdot \frac{\pi}{180}$$

$$\varphi = \pm \frac{D_y}{L_z} \cdot \frac{\pi}{180}$$

where signs indicate on which side of the origin lies the feed in respectively the X-Z plane and Y-Z plane; $D_x$ and $D_y$ are the spacing between the elements along respectively the X-axis (equal spacing) and the Y-axis (equal spacing). In this connection, reference is made to FIG. 5 illustrating the diagram of the antenna as seen from behind—the Z-axis is into the page.

Figure 6:
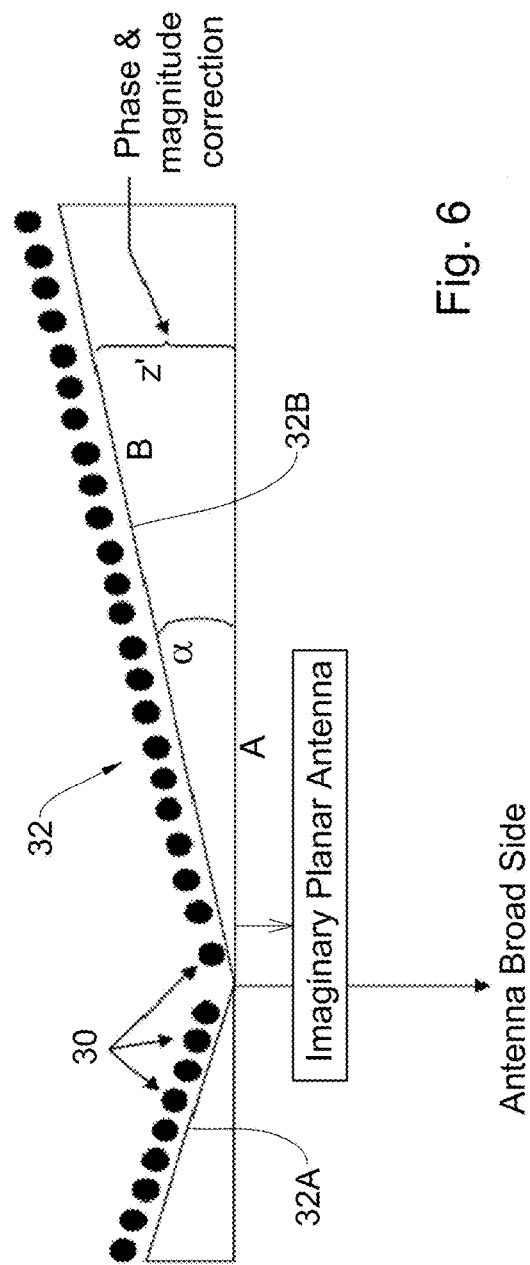
FIG. 6 exemplifies a diagram describing the principles of calculation of the phase and magnitude corrections for a conformal phase array antenna in order to create a desired antenna beaming.

Reference is made to FIG. 6 showing a diagram describing the principles of calculation of the phase and magnitude corrections to the antenna taper which are to be carried out in order to create a desired antenna beam (radiation pattern) for a conformal antenna. In this specific but not limiting example, the bent antenna configuration is used. The radiating surface 32 of the physical antenna (radiating unit 12A) is in the form of two inclined surfaces 32A and 32B along which the radiating elements 30 are arranged in spaced-apart relationship. The radiation pattern of such radiating unit is defined by virtual arrangement of radiating elements in the effective radiating surface 32' located in the virtual plane VP oriented as describe above, being perpendicular to the antenna broad side. This creates a so-called "imaginary planar antenna". As also exemplified in the figure, the surface regions/portions 32A and 32B of the radiating surface 32 may form different angles with the virtual plane VP.

For simplicity of calculation, the imaginary planar antenna is placed at a tangential point to the radiating surface 32 of the physical structure of the radiating unit of the antenna whose operation is being managed. It should, however, be understood that the imaginary planar antenna (virtual plane) can be at any distance from the physical antenna either behind or in front of it, provided it is perpendicular to the selected direction (antenna boresight). The imaginary planar antenna is constructed in accordance with the desired radiation direction of the conformal antenna. This means that the effective surface of the imaginary planar antenna is selected in accordance with the selected direction, i.e. for the selected desired active sector of the array (set of M out of N antenna elements) to be operated for creation of the desired antenna pattern. The effective radiating surface is thus parallel to the selected tangential plane perpendicular to the desired direction (being at any distance to said tangential plane, e.g. zero distance).

The radiating elements 30 on the physical curved radiating surface 32 are thus differently spaced from the effective planar radiating surface 32'. Accordingly, the phase and magnitude (the weights—the taper) of the operative radiation of the elements should be corrected, creating the imaginary planar antenna in space (effective radiating surface) where the weights are projected onto and then, mathematically, from this imaginary planar antenna (beam forming virtual plane) creating the desired antenna beam (pattern) in whatever direction required. It should be understood that this is limited by physical and electrical properties. The distance z' from the antenna element(s) to the imaginary planar antenna (effective radiating surface 32') can then be calculated and used as the basic unit to determine the phase and magnitude corrections. The phase correction is a direct calculation of the number of wavelengths of the radiation that fit into the distance to the imaginary planar antenna from the individual physical antenna elements. The amplitude correction, based on the same distance calculation, is taken to be the attenuation of the amplitude dropping off as the distance squared from the element to the imaginary planar antenna.

Let us consider operational data (phase and amplitude) for the radiating elements arranged along the surface portion 32B forming angle α with the virtual plane (effective surface). The effective length A of the imaginary planar antenna created by the radiating portion 32A is determined as:

$$A = B \cdot \cos\alpha = n \cdot D_x \cdot \cos\alpha$$

where B is the length of the surface portion 32B; n is the number of the radiating elements 30 arranged along the radiating portion 32B, and $D_x$ is the spacing between them.

The "height" or depth $z_n$ of the n-th antenna element with respect to the virtual plane VP, for which the phase and amplitude are to be corrected, is determined as:

$$z_n = tg\alpha \cdot A_n = n \cdot D_x \cdot \sin\alpha$$

The phase correction $\Delta p$ and the amplitude correction $\Delta I$ can be determined as follows:

$$\Delta p = 2\pi \cdot \frac{z_n}{\lambda};$$

$$\Delta I \approx \left(\frac{z_n}{\lambda}\right)^{-2}$$

Figure 7A:
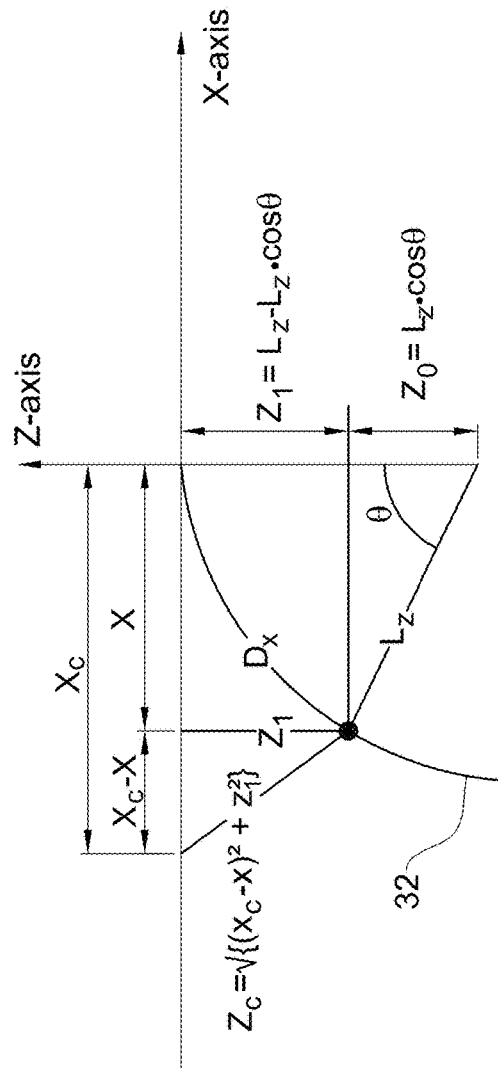
FIGS. 7A and 7B illustrate more specifically two calculation examples, for respectively equal and unequal spacing between virtual radiating elements in a virtual antenna plane.
Figure 7B:
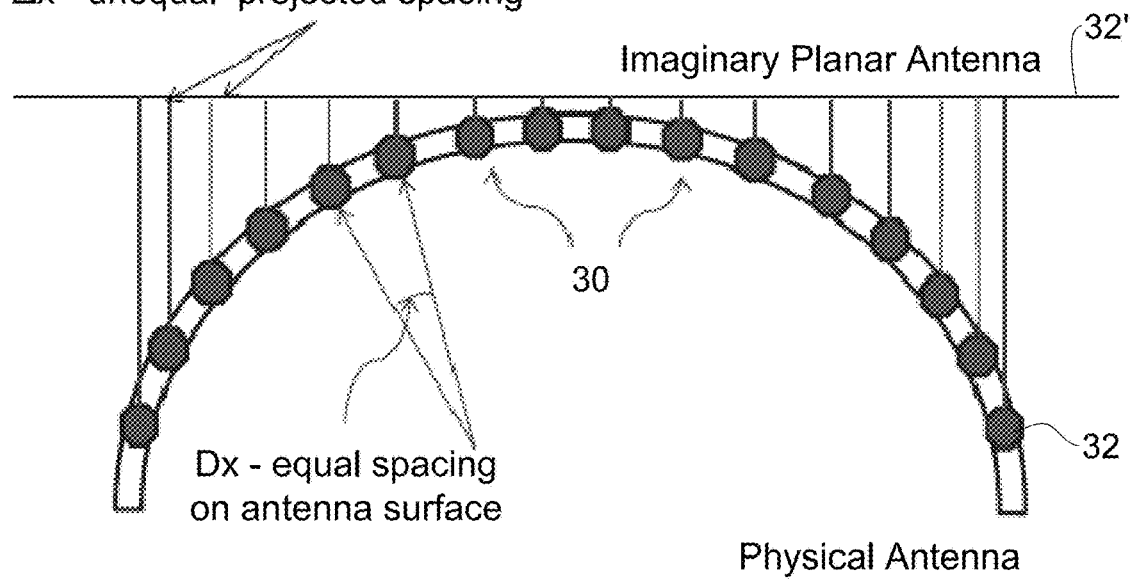

Reference is now made to FIGS. 7A and 7B illustrating more specifically two calculation examples, in which the virtual arrangement of antenna elements (i.e. in the virtual plane) has equal spacing between the virtual radiating elements (FIG. 7A), and has unequal spacing (FIG. 7B). It should be understood, and described above, that the physical radiating unit of the antenna is configured accordingly, i.e. the physical antenna elements are arranged on the radiating unit such that corresponding virtual antenna elements are distributed on the imaginary planar antenna (corresponding to desired radiation direction of the antenna) with equal spacing, or not.

As shown in FIG. 7A, physical radiating elements (one such element 30 being shown in the figure) are located on a cylindrically shaped radiating surface 32. Irrespective of whether the physical radiating elements are arranged on the surface 32 with equal spacing or not, the virtual elements in the imaginary antenna/effective radiating surface 32' are to be equally spaced. Thus, generally speaking, the antenna element 30 is to be presented in the virtual plane by an element 30B' which is spaced apart from that of its direct projection on surface 32'. The figure shows in a self-explanatory manner all the parameters to be considered to calculate the "height" (correction distance $Z_c$ along the Z-axis) for the virtual element location on the surface 32' corresponding to equal spacing, $x_c$, between the virtual elements. More specifically:

$$x = L_z \cdot \sin\theta$$

$$Z_0 = L_z \cdot \cos\theta$$

$$Z_c = \sqrt{\{(x_c - x)^2 + z_1^2\}}$$

where $Z_1 = L_z - L_z \cdot \cos\theta$

Phase correction is determined as:

$$\Delta P = 2\pi \cdot \{(-z_c/\lambda) - |\_-z_c/\lambda\_|\}$$

Thus, the planar representation (virtual representation) of the physical conformal (non-planar) antenna can be achieved by building the physical antenna with spacing between the radiating elements such that their projection on the imaginary planar antenna (virtual plane) result in equal spacing of the virtual elements in the effective radiating surface. As shown in FIG. 7A, if the distance $x_c$ is the equal spacing on the effective surface and the radius $L_z$ of curvature of the physical radiating surface 32, then we have:

$$\Theta n = \sin^{-1}\left\{\frac{((2n-1)/2) \cdot x_c}{L_z}\right\} = \frac{D_x n}{L_z}$$

and hence:

$$D_x n = \Theta_n \cdot L_z = L_z \cdot \sin^{-1}\left\{\frac{((2n-1)/2) \cdot x_c}{L_z}\right\} = \frac{D_x n}{L_z}$$

where $D_x n$ is the spacing of the radiating elements on the physical radiating surface, with the limit being defined by the following condition:

$$((2n-1)/2) \cdot x_c \leq L_z$$

FIG. 7B exemplifies the case when the radiating elements 30 are arranged with substantially equal spacing $D_x$ on the cylindrical or spherical radiating surface 32. This arrangement results in unequal spacing $\Delta x$ between corresponding virtual elements on the effective surface 32' (virtual plane or imaginary planar antenna configuration). The spacing $\Delta x$ for each two neighboring adjacent elements, as well as the height/depth (distance between the physical and effective radiating surfaces 32 and 32') for each virtual element can be easily calculated.

As described above with regard to a phased array antenna in general (e.g. planar antenna array), a distance $D_x$ between the adjacent antenna elements in the phased array on the physical radiating surface is dictated by the operating frequency of the antenna array and desired reduction/suppression of sidelobes.

In order to reduce an increase in the intercardinal side lobes of the radiation pattern, the antenna elements with narrow beams can be used. In addition, considering the above described conformal antenna, once the tapering has been projected and corrected to the imaginary planar antenna, steering of the antenna beam can be carried out in the standard phase addition technique.

The limitations to the projection onto the imaginary planar antenna are associated with the physical limit of the antenna elements "to see" to angles beyond their line of sight to the direction required for steering. To this end, as indicated above, for each antenna radiation direction, an appropriate active sector of the array is selected (set of M out of N antenna elements).

Figure 8:
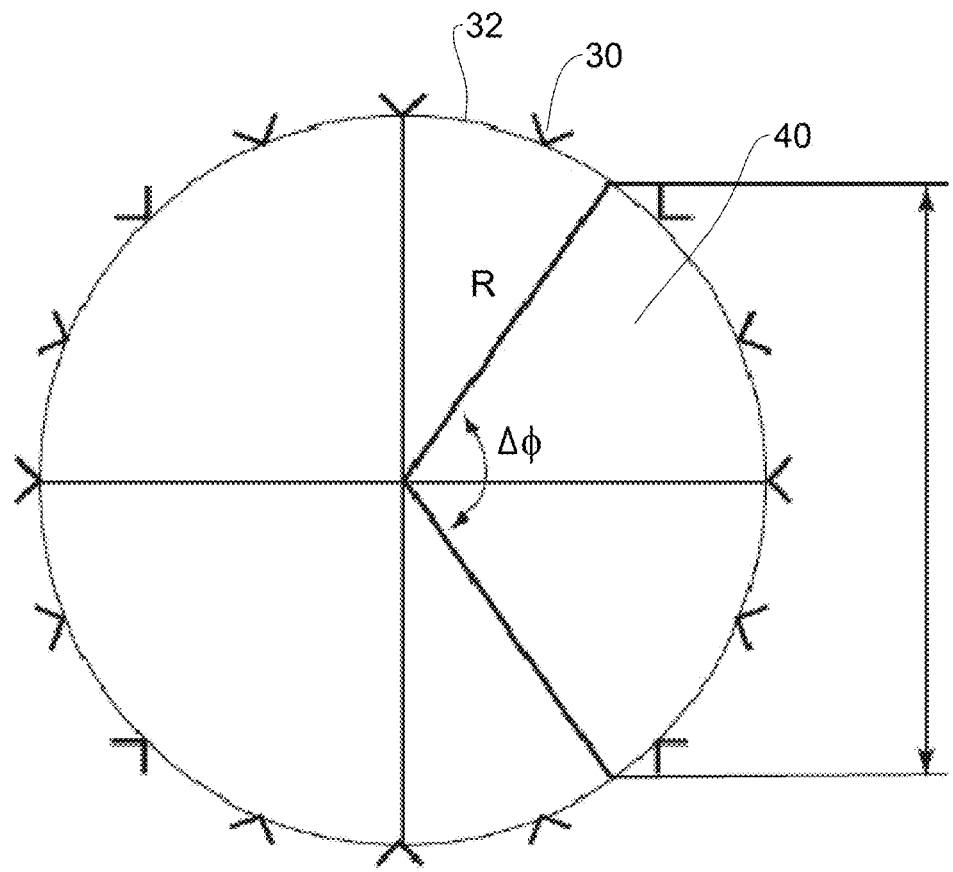
FIG. 8 exemplifies a circular cylinder radiating surface of the antenna with N radiating elements and an active sector thereof formed by M radiating elements selected for specific antenna radiation direction.

In this connection, reference is made to FIG. 8 exemplifying a circular cylinder radiating surface 32 of the antenna with N radiating elements arranged in a spaced apart relation on the surface 32. The total antenna area for a circular cylinder with radius R and height h is determined as:

$$A_{tot} = 2\pi R h$$

For a specific radiation direction, an active sector 40 defined by the group/set of M elements, is selected. The area, $A_{eff}$, on the effective radiating surface 32' (i.e. the projected area) for the specific antenna radiation direction, depends on the size of the angular sector $\Delta \varphi$ of the cylindrical shape that is used (the active area/sector). As can be seen in the example of FIG. 8:

$$A_{eff} = 2Rh \sin(\Delta \omega/2),$$

where $\Delta \varphi/2$ is the maximum element look angle (maximum scan angle or field of view). The maximum projected area that can be used is 2Rh, but this would require the edge elements to be steered up to 90° from the local normal. This is probably not possible or at least not very effective.

Selecting an active sector of about 120° is more reasonable, corresponding to a maximum element look angle of 60°. Thus, as indicated above, the M radiating elements defining the preferred active sector of the radiating surface is selected per each desired radiation direction of the antenna.

As described above, the operational data of the antenna elements is to provide antenna beaming in the desired direction. This is achieved by beam forming causing coherent addition of the radiation (being transmitted or received) of the multiple antenna elements. In order to obtain coherent addition between multiple radiation components in the desired direction, the radiation components of the selected different antenna elements (having interfering radiation components) which propagate in the desired direction, should match one another in frequency, phase and polarization.

Conventional beam forming typically deals with frequency and phase adjustment in order to obtain the beam in the desired direction. Indeed, as described above, in planar phased arrays, in which all the antenna elements "face" the same direction, and the polarization of radiation components from the different elements is similar and therefore the provided that the phases of the radiation components are properly adjusted, they coherently add up to form the radiation beam in the desired direction, with substantially no losses associated with polarization mismatches.

However, in conformal antennas, the elements generally do not face the same direction and therefore the polarizations of their radiation components are somewhat different (even for the case the antenna elements are similar to one another). This is a source of energy losses (polarization mismatches associated losses) since only the components of the similar polarizations coherently add up in the radiation pattern of the desired direction. These polarization losses are to be reduced/minimized.

In this connection, it should be understood that, in the phased array of antenna elements, the element pattern (radiation of the radiating element) determines polarization of the array of the elements at the peak of the main beam, i.e. beaming in the desired direction. The invention provides for polarization correction of each (or at least some) of the M antenna element within the active sector of the radiating unit, which is selected in accordance with the desired radiation direction of the antenna. As described above, the desired polarization pattern $P_{pol}$ for the antenna beaming is defined by operative polarization polarizations of the M antenna elements, $P_{pol}(P^{(1)}_{pol}; P^{(m)}_{pol})$. Each of these operative polarizations, $P^{(i)}_{pol}; P^{(m)}_{pol}$, is defined by a predetermined ratio between two orthogonal polarization components in the antenna element radiation, i.e. for the i-th radiating element, the total polarization vector $P^{(i)}_{pol}$ is properly oriented with respect to the desired antenna radiation direction (antenna boresight). Variation of such ratio provides for variation of the polarization state of the antenna element.

This is schematically illustrated in FIG. 9, showing the array/matrix of ten antenna elements, which constitutes a selected set of M elements defining the active sector for the selected radiation direction. The polarization of each antenna element is adjusted to provide a predetermined ratio R between the two orthogonal polarization components aimed at obtaining the predetermined total polarization vector for the antenna element, to ensure improved coherent addition for the radiation components of these elements.

The above can be achieved by one of the following techniques: (i) appropriately feeding the radiating element (as will be exemplified further below); (ii) incorporating a polarization rotator in the antenna element; and (iii) configuring the antenna element as two-element cell and separately feeding the two elements of the cell such their polarizations provide together the properly oriented total polarization vector.

Let us consider an example of a micro-strip patch as the radiating element of the array. Standard model of the micro-strip patch is two radiating slots with a length of $\lambda/2$ at a distance of $\lambda/2$ between them. This is schematically illustrated in FIG. 10A. In a dual polarized array, this structure is copied with a rotation of 90 about the Z-axis. Each of the two slots is represented by a magnetic dipole with a length of $\lambda/2$ above the ground plane. The electric field in the opening of a single slot is centered about the origin. This is shown in FIG. 10B.

The normalized electric far field of the single slot is:

$$Eslo \propto \frac{\cos(\frac{\pi}{2}\sin\theta\sin\varphi)}{1-(\sin\theta\sin\varphi)^2} \cdot (\cos\varphi\hat{\theta} - \cos\theta\sin\varphi\hat{\varphi})$$

With the assumption that $a \ll \lambda$, and adding the array coefficient between the two slots, the approximation to the far electric field of the element is:

$$E^y_{patch} \propto \frac{\cos(\frac{\pi}{2}\sin\theta\sin\varphi)\cos(\frac{\pi}{2}\sin\theta\cos\varphi)}{1-(\sin\theta\sin\varphi)^2} \cdot (\cos\varphi\hat{\theta} - \cos\theta\sin\varphi\hat{\varphi})$$

$$E^x_{patch} \propto \frac{\cos(\frac{\pi}{2}\sin\theta\cos\varphi)\cos(\frac{\pi}{2}\sin\theta\sin\varphi)}{1-(\sin\theta\sin\varphi)^2} \cdot (\sin\varphi\hat{\theta} + \cos\theta\cos\varphi\hat{\varphi})$$

Here, the factors that are responsible for the polarization losses are:

$$e^y = (\cos\varphi\hat{\theta} - \cos\theta\sin\varphi\hat{\varphi});$$

$$e^x = (\sin\varphi\hat{\theta} + \cos\theta\cos\varphi\hat{\varphi})$$

As described above, the polarization correction/adjustment according to the invention is based on the inventors' understanding that in order to minimize/reduce the polarization losses (i.e. improve the coherent addition) of conformal phase array antenna in the desired antenna radiation direction, polarization of the radiating component of each antenna element selected to be involved in the beam forming for said direction needs to be controllably adjusted. This adjustment is based on the relative orientation of the desired beam forming direction with respect to the antenna element boresight ($\theta$ and $\varphi$ angles).

Let us consider a real finite ratio between $E_\theta$ and $E_\varphi$ to create linear polarization in a general direction. Feeding of dual-polarization is obtained by a real ratio R between the two magnetic current components, according to the weighting factors:

$$Jmy = Jmy\hat{Y}$$

$$Jmx = Jmx\hat{X}$$

$$Jmy = RJmx$$

Then, taking this into account, the far electric field is a superposition of the above x- and y-components of the field with these weighting factors, as follows:

$$E(\theta, \varphi) = \frac{\cos(\frac{\pi}{2}\sin\theta\cos\varphi)\cos(\frac{\pi}{2}\sin\theta\sin\varphi)}{1-(\sin\theta\sin\varphi)^2} \cdot (\sin\varphi\hat{\theta} + \cos\theta\cos\varphi\hat{\varphi}) + $$

$$R\frac{\cos(\frac{\pi}{2}\sin\theta\sin\varphi)\cos(\frac{\pi}{2}\sin\theta\cos\varphi)}{1-(\sin\theta\sin\varphi)^2} \cdot (\cos\varphi\hat{\theta} - \cos\theta\sin\varphi\hat{\varphi})$$

or $$E(\theta\varphi) = E_\theta(\theta, \varphi)\hat{\theta} + E_\varphi(\theta, \varphi)\hat{\varphi}$$

Here, the expressions in parenthesis are the projection coefficients that are responsible for the polarization losses, and the expressions outside the parenthesis correspond to the element patterns, which are responsible for the scanning losses and the dependence of the active amplitude of the scanning direction.

Using the cosine direction space (u, v) defined as:

$$u = \sin\theta\cos\varphi$$

$$v = \sin\theta\sin\varphi$$

$$\omega = \cos\theta = \sqrt{1-u^2-v^2}$$

the far electric field can be expressed:

$$E(u,v) = \frac{\cos(\frac{\pi}{2}u)\cos(\frac{\pi}{2}v)}{1-(u)^2} \cdot \frac{(v\hat{\theta} + \omega u\hat{\varphi})}{\sqrt{u^2+v^2}} + R\frac{\cos(\frac{\pi}{2}u)\cos(\frac{\pi}{2}v)}{1-(v)^2} \cdot \frac{(u\hat{\theta} + \omega v\hat{\varphi})}{\sqrt{u^2+v^2}}$$

where $$\frac{\cos(\frac{\pi}{2}u)\cos(\frac{\pi}{2}v)}{1-(u)^2} \text{ and } \frac{(v\hat{\theta} + \omega u\hat{\varphi})}{\sqrt{u^2+v^2}}$$

are, respectively, the element pattern with respect to the x-axis and the associated polarization factor; and $$\frac{\cos(\frac{\pi}{2}u)\cos(\frac{\pi}{2}v)}{1-(v)^2} \text{ and } \frac{(u\hat{\theta} + \omega v\hat{\varphi})}{\sqrt{u^2+v^2}}$$

are, respectively, the element pattern with respect to the y-axis and the associated polarization factor.

The polarization coefficients/factors in the above equation are small in absolute value from $1/\sin\theta$. The coefficient R (ratio between the orthogonal polarization components can obtain any value, finite or infinite. Coefficient R can be described as the ratio of two finite values: R=P/Q. The above equation for the far electric field can be expressed (to within a constant value) as:

$$E(u,v) = Q\frac{\cos(\frac{\pi}{2}u)\cos(\frac{\pi}{2}v)}{1-(u)^2} \cdot \frac{(v\hat{\theta} + \omega u\hat{\varphi})}{\sqrt{u^2+v^2}} + P\frac{\cos(\frac{\pi}{2}u)\cos(\frac{\pi}{2}v)}{1-(v)^2} \cdot \frac{(u\hat{\theta} + \omega v\hat{\varphi})}{\sqrt{u^2+v^2}}$$

where: $P,Q = P,Q(\alpha,\beta,u,v)$

Let us compare the received power W in every direction (u, v) to the maximal power that is received in the same direction in the situation of matching ideal polarization. The received power as a response to an incident linear wave of the type $$E^{inc} = \alpha\hat{\theta} + \beta\hat{\varphi}$$

where $\alpha$ and $\beta$ are the relative amounts of the vertical ($\alpha$) and horizontal ($\beta$) polarizations, respectively.

With the normalization condition of:

$$\alpha^2 + \beta^2 = 1$$

the received power W is proportional to:

$$W=|E^{inc}\cdot e|^2$$

Hence, the received power W may be defined as:

$$W = |e_\theta \alpha + e_\varphi \beta|^2 = \frac{1}{u^2+v^2}\left|P\frac{u\alpha-\omega v\beta}{1-v^2} + Q\frac{v\alpha-\omega u\beta}{1-u^2}\right|$$

Normalizing power W such that its maximum value is 1, provides that power W obtains the meaning of a loss coefficient of polarization. This normalization brings about a relationship between P and Q:

$$P\frac{P^2}{(1-v^2)^2} + \frac{Q^2}{(1-u^2)^2} = 1$$

The possible global maximum of W, as defined above, for all the polarization states, all scanning directions, and all the feeds (radiating elements) is 1. For a particular polarization, the weights P and Q can be determined, by finding the local maximum for $|E^{inc}\cdot e|^2$ under the constraint of normalization of the power. As a result, we obtain (using LaGrange multipliers):

$$R = \frac{P}{Q} = \frac{u\alpha-\omega v\beta}{v\alpha+\omega u\beta} \cdot \frac{1-v^2}{1-u^2}$$

and further $$P(\alpha, \beta, u, v) = \frac{1-v^2}{\sqrt{u^2+v^2}} \cdot \frac{u\alpha-\omega v\beta}{\sqrt{\alpha^2+\omega^2\beta^2}}$$

$$Q(\alpha, \beta, u, v) = \frac{1-v^2}{\sqrt{u^2+v^2}} \cdot \frac{v\alpha-\omega v\beta}{\sqrt{\alpha^2+\omega^2\beta^2}}$$

The above equation provides the weights that excite the two polarizations to receive the maximum power for a wave incident at a polarization ($\alpha,\beta$) for the scanning angle of (u,v).

Applying this equation to that of the possible received power W, we obtain the polarization losses, with respect to the received power, in vertical polarization from an incident wave with horizontal polarization, with dependence on the scanning angle (desired direction) and in the polarization of the incident wave, for optimal matching to the same polarization.

$$W=\alpha^2+\omega^2\beta^2$$

This equation shows a simple relationship that is dependent on $\cos^2$ and independent of angle φ. This means that the polarization losses for constant θ can be presented as horizontal straight lines, with a value dependent on θ and the polarization of the incident wave only.

What is claimed is:

1. A method for managing operation of a conformal phased-array antenna by a computerized system comprising memory and data processor, the method comprising:
providing structural data about an antenna to be operated, said structural data comprising data indicative of a geometry of a curved radiating surface defined by an arrangement of N antenna elements of a phased array and data indicative of said arrangement of N antenna elements;
utilizing, by said data processor, input data indicative of a selected direction of antenna operation and processing said structural data about the antenna, said processing comprising determining operational data for each of the N antenna elements defining a desired radiation pattern of the antenna for said selected direction, said operational data comprising amplitude, phase and polarization of radiation for each antenna element, wherein for each selected direction of antenna operation, a set of M elements is determined out of said N antenna elements (M≤N) to be operated by said operational data for said desired radiation pattern of the antenna, by determining, for each selected direction, beam forming data comprising at least a phase pattern and a polarization pattern corresponding to the desired radiation pattern, and being defined by respectively, operative phases and polarizations for said M elements.

2. The method of claim 1, wherein said beam forming data further comprises an intensity pattern data comprising intensity values for said M elements respectively.

3. The method of claim 1, wherein said operative polarization is indicative of a polarization state of radiation of a respective element, being defined by a ratio between two orthogonal polarizations in radiation of the respective antenna element, variation of said ratio providing for variation of the polarization state of the antenna element.

4. The method of claim 1, wherein said ratio is determined based on a relative orientation of the selected direction with respect to a boresight direction of the antenna element.

5. The method of claim 1, wherein said operative polarization is defined by a distance between a respective element on said curved surface and a virtual plane being a plane perpendicular to the selected direction for radiation of a predetermined wavelength.

6. The method of claim 1, wherein said operative phase is defined by a distance between a respective element on said curved surface and a virtual plane being a plane perpendicular to the selected direction for radiation of a predetermined wavelength.

7. The method of claim 1, wherein said amplitude is determined in accordance with a distance between a respective element on said curved surface and a virtual plane being a plane perpendicular to the selected direction.

8. The method of claim 1, further comprising controllably modifying the operational data for each of the antenna elements in accordance with variation of the input data indicative of a selected direction.

9. A computerized system for managing operation of a conformal phased-array antenna, the system comprising:
a memory utility for storing structural data about an antenna to be operated, said structural data comprising data indicative of a geometry of a curved radiating surface of said antenna and data indicative of an arrangement of N antenna elements in a phased-array of the antenna;
data input utility for receiving input data indicative of a selected direction of antenna operation; and
data processor and analyzer utility configured to process said structural data about the antenna, and generate operational data for each of the antenna elements to obtain a desired radiation pattern of the antenna for said selected direction, said operational data comprising amplitude, phase and polarization of radiation for each antenna element, the data processor and analyzer utility comprising:
   a direction controller module configured and operable to utilize the input data about the selected direction of antenna operation, and determine, for each selected direction, a set of M elements out of said N antenna elements (M≤N) to be operated by said operational data for said desired radiation pattern of the antenna; and
a beam forming module configured and operable to determine, for each selected direction, beam forming data comprising at least a phase pattern and a polarization pattern corresponding to the desired radiation pattern, said phase and polarization patterns comprising, respectively, operative phase and polarization for each of said M elements, said beam forming module being configured and operable to determine said at least phase and polarization patterns of the respective antenna element based on a distance between the respective antenna element on said curved surface and a virtual plane being a plane perpendicular to the selected direction.

10. The system of claim 9, wherein said beam forming module is further configured and operable to determine amplitude pattern data comprising amplitude values for said M elements respectively, an amplitude value of the respective antenna element being determined based on a distance between the respective antenna element on said curved surface and said virtual plane.

11. The system of claim 9, wherein said beam forming module is configured and operable to determine the operative polarization of the respective antenna element defined by a ratio between two orthogonal polarizations in radiation of the respective antenna element defining a polarization state of the respective antenna element.

12. The system of claim 9, wherein said beam forming module determines the operative polarization of the respective antenna element based on a relative orientation of the selected direction with respect to a boresight direction of the respective antenna element.

13. The system of claim 9, wherein said beam forming module is configured and operable to determine the operative phase based on said distance for radiation of a predetermined wavelength.

14. The system of claim 9, comprising a control utility connectable to said beam forming module and configured and operable to utilize the operational data for adjusting at least the phase and polarization of the antenna elements.

15. The system of claim 14, wherein said control utility is configured and operable for modifying the operational data for each of the antenna elements in accordance with variation of the input data indicative of a selected direction.

16. A method for managing operation of a conformal phased-array antenna by a computerized system comprising memory and data processor, the method comprising:
   providing structural data about the antenna to be operated, said structural data comprising data indicative of a geometry of a curved radiating surface defined by an arrangement of N antenna elements of the phased array and data indicative of said arrangement of N antenna elements;
   utilizing, by said data processor, input data indicative of a selected direction of antenna operation and processing said structural data about the antenna, said processing comprising determining operational data for each of the antenna elements defining a desired radiation pattern of the antenna for said selected direction, wherein for each selected direction of antenna operation, a set of M elements is determined out of said N antenna elements (M≤N) to be operated by said operational data for said desired radiation pattern of the antenna, said operational data comprising amplitude, phase and polarization of radiation for each antenna element, defined by a distance between the respective element on said curved radiating surface and a virtual plane being a plane perpendicular to the selected direction for the radiation of a predetermined wavelength.

17. The method of claim 16, wherein said processing, for each selected direction, comprises determining beam forming data comprising at least a phase pattern and a polarization pattern corresponding to the desired radiation pattern, and being defined by respectively, operative phases and polarizations for said M elements.

18. A computerized system for managing operation of a conformal phased-array antenna, the system comprising:
   a memory utility for storing structural data about a given antenna to be operated, said structural data comprising data indicative of a geometry of a curved radiating surface of said antenna and data indicative of an arrangement of N antenna elements in the phased-array;
   data input utility for receiving input data indicative of a selected direction of antenna operation;
   data processor and analyzer utility configured to process said structural data about the antenna, and generate operational data for each of the antenna elements to obtain a desired radiation pattern of the antenna for said selected direction, said operational data comprising amplitude, phase and polarization of radiation for each antenna element; said data processor and analyzer utility comprising:
      a direction controller module configured and operable to utilize the input data about the selected direction of antenna operation, and determine, for each selected direction, a set of M elements out of said N antenna elements (M≤N) to be operated by said operational data for said desired radiation pattern of the antenna;
      a beam forming module configured and operable to determine, for each selected direction, beam forming data comprising at least a phase pattern and a polarization pattern corresponding to the desired radiation pattern, said phase and polarization patterns comprising, respectively, operative phase and polarization for each of said M elements, and
      a control utility connectable to said beam forming module and configured and operable to utilize the operational data for adjusting at least the phase and polarization of the antenna elements.

19. The system of claim 18, wherein said beam forming module is configured and operable to determine said at least phase and polarization patterns of a respective antenna element based on a distance between the respective antenna element on said curved surface and a virtual plane being a plane perpendicular to the selected direction.

20. The system of claim 19, wherein said beam forming module is further configured and operable to determine amplitude pattern data comprising amplitude values for said M elements respectively, the amplitude value of the respective antenna element being determined based on a distance between the respective antenna element on said curved surface and said virtual plane.

21. The system of claim 19, wherein said beam forming module is configured and operable to determine the operative polarization of the respective antenna element defined by a ratio between two orthogonal polarizations in the antenna element radiation defining a polarization state of the antenna element.

22. The system of claim 19, wherein said beam forming module determines the operative polarization of the respective antenna element based on a relative orientation of the selected direction with respect to a boresight direction of the antenna element.

23. The system of claim 19, wherein said beam forming module is configured and operable to determine the operative phase based on said distance for the radiation of a predetermined wavelength.

24. The system of claim 18, wherein said control utility is configured and operable for modifying the operational data for each of the antenna elements in accordance with variation of the input direction data.

* * * * *